United States Patent [19]

Oguchi et al.

[11] Patent Number: 4,957,854
[45] Date of Patent: Sep. 18, 1990

[54] OPTICAL RECORDING MEDIUM

[75] Inventors: Yoshihiro Oguchi, Yokohama; Yoshio Takasu, Tama; Kyo Miura, Sagamihara, all of Japan

[73] Assignee: Canon Kabushiki Kaisha, Tokyo, Japan

[21] Appl. No.: 179,262

[22] Filed: Apr. 8, 1988

[30] Foreign Application Priority Data

Apr. 13, 1987 [JP] Japan .................................. 62-91460

[51] Int. Cl.$^5$ .............................................. G11B 7/24
[52] U.S. Cl. ..................................... 430/495; 430/270; 430/945
[58] Field of Search ...................... 430/270, 495, 945

[56] References Cited

U.S. PATENT DOCUMENTS

| | | | |
|---|---|---|---|
| 4,364,986 | 12/1982 | Zwanenburg et al. | 428/156 |
| 4,499,165 | 2/1985 | Molaire | 430/17 |
| 4,605,607 | 8/1986 | Nikles et al. | 430/17 |
| 4,728,724 | 3/1988 | Jones et al. | 430/19 |

FOREIGN PATENT DOCUMENTS 230891 11/1985 Japan .

*Primary Examiner*—Paul R. Michl
*Assistant Examiner*—Mark R. Buscher
*Attorney, Agent, or Firm*—Fitzpatrick, Cella, Harper & Scinto

[57] ABSTRACT

An optical recording medium comprises an organic thin film recording layer on a substrate, which medium performs recording of information by forming a pit with photoenergy, said organic thin film recording layer comprising an organic dye and a polymeric surfactant.

12 Claims, No Drawings

OPTICAL RECORDING MEDIUM

BACKGROUND OF THE INVENTION

1. Field of the Invention

This invention relates to an optical recording medium capable of recording and/or reproducing by light, particularly laser beam, more particularly to an optical recording medium having an organic dye thin film improved in optical characteristics and recording and reproducing characteristics.

2. Related Background Art

Generally speaking, an optical recording medium such as optical disc or optical card can record information at high density by forming optically detectable small pits of, for example, about 1 $\mu$m on a thin recording layer provided on a substrate having spiral, circular, or straight line grooves. When converged laser beam is scanned on the surface of the recording layer, the recording layer absorbs the laser energy to form optically detectable pits, whereby information is written.

For example, according to the heat mode recording system, the recording layer absorbs heat energy, whereby small concave pits can be formed by evaporation or melting at that site. According to another heat mode recording system, by absorption of the laser energy irradiated, pits having optically detectable density difference can be formed at that site.

The information recorded in the optical recording medium is detected by scanning a laser beam along the track and reading the optical change between the portion where the pit is formed and the portion where no pit is formed. For example, in the case of optical disc, the laser beam is scanned along the track, and the photoenergy reflected by the disc is monitored by a photodetector. The portion where no pit is formed deflects sufficiently the laser beam and the output of the photodetector becomes greater. On the other hand, at the portion where the pit is formed, deflection becomes lower to make the output of the photodetector smaller.

As the recording layer of such optical recording medium, inorganic compound films such as metal thin films of Te, Bi, Sb, etc. or chalcogenide type amorphous thin films, etc. have been primarily used. However, these thin films have various drawbacks such that it is difficult to control the reflectance relative to laser beam and that they are liable to be oxidized by the influence of temperature, humidity, etc.

On the other hand, studies of optical recording medium comprising an organic dye thin film capable of changing optical properties by use of photoenergy have been actively done as shown in Japanese Laid-Open Patent Application No. 219090/1983. Use of an organic dye can make it possible to form easily a thin film having absorption ability corresponding to the oscillated wavelength of the laser beam, and a thin film of a dye alone has a particular reflection ability, whereby reflected light necessary for reproduction can be obtained. Further, an organic dye thin film can be formed by dissolving an organic dye in a solvent and coating it, thus being also excellent in bulk productivity. As such solvent, in ordinary cases, it may be preferable to use a good solvent for the organic dye such as dichloroethane, etc. However, since such a solvent will corrode the resin substrate frequently used as the substrate for optical card or optical disc such as polymethyl methacrylate or polycarbonate substrate, they cannot be coated directly on such substrate. Accordingly, for direct coating on a resin substrate, solvents which will not corrode substrates are selected, and these are generally poor solvents for organic dyes, and therefore even when coated on substrates, it is impossible to obtain an organic dye thin film which has necessary film thickness and uniformity to be used as the recording layer. However, the poor solvent as mentioned here refers to a solvent which dissolves only 1 wt. % or less of an organic dye, and examples of such solvent may include alcohols, ethers, esters, aromatics, aliphatic hydrocarbons, etc.

When these solvents are used, an organic dye thin film with necessary thickness can be prepared for the recording layer by coating a dispersion of the organic dye. However, the thin film recording layer thus obtained is not uniform, whereby there has been involved the problem that the noise level of the optical information recording medium having this recording layer is increased to deteriorate C/N ratio.

SUMMARY OF THE INVENTION

A primary object of the present invention is to provide an optical recording medium having an organic thin film recording layer having reflectivity equal to a thin film of an organic dye alone.

Another object of the present invention is to provide an optical recording medium having an organic thin film recording layer having excellent uniformity, stability and durability equal to those of a thin film comprising an organic dye alone.

Still another object of the present invention is to provide an optical recording medium having an organic thin film recording layer which can alleviate the coating conditions in relationship with the coating solvent.

According to an aspect of the present invention, there is provided an optical recording medium comprising an organic thin film recording layer on a substrate, which performs recording of information by forming a pit with photoenergy, said organic thin film recording layer comprising an organic dye and a polymeric surfactant.

In the present invention, the above dye thin film may be considered to have high reflectivity due to the presence of an organic dye under uniform micelle formation state in the polymeric surfactant. The micelle formation state refers to the state in which the surfactant covers around the organic dye which is not in monomolecular state but in the form of an agglomerated body formed by association muturally between the molecules or extremely fine crystalline particles to have enclosed it therein. The dye thin film under such micelle formation state may be considered to obtain reflectivity similar to the thin film of the dye alone, because an agglomerated body of the organic dye similar to the thin film of the dye alone as described above can be easily formed.

Further, in the dispersion liquid, the organic dye is dispersed with the polymeric surfactant under micelle formation state in the form of extremely fine crystals or an agglomerated body formed by association mutually between the molecules, and also these extremely fine crystals or agglomerated bodies formed by association mutually between the molecules are each covered with the surfactant therearound, whereby these crystals and agglomerated bodies will not grow to greater crystals or agglomeration and the micelle formation state is stable. For this reason, when the dispersion is coated on a substrate, an organic thin film recording layer which is uniform and stable similarly as the thin film recording layer comprising the organic layer alone provided by coating can be obtained.

Thus, according to the present invention, without use of a solvent which will corrode the resin substrate, it is possible to form by coating on a substrate an organic thin film recording layer having reflectivity, uniformity and stability equal to the thin film recording layer comprising the dye alone provided by coating.

DETAILED DESCRIPTION OF THE INVENTION

A preferable polymeric surfactant to be used in the present invention is a cationic polymeric surfactant comprising a polymer having a monomer represented by the following formula [I]:

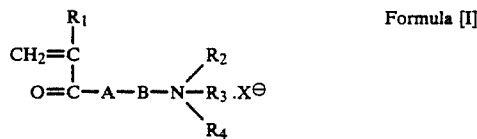

Formula [I]

(wherein $R_1$ is H or $CH_3$; $R_2$ and $R_3$ are each alkyl group having 1 to 4 carbon atoms or hydroxyalkyl group having 2 to 4 carbon atoms, which may be either the same or different; $R_4$ is H, alkyl group having 1 to 4 carbon atoms, hydroxyalkyl group having 2 to 4 carbon atoms or benzyl group; A is oxygen atom or NH; B is alkylene group having 1 to 4 carbon atoms or hydroxyalkylene group having 2 to 4 carbon atoms; and $X^\ominus$ is an anionic counterion).

The organic thin film recording layer of the present invention is obtained in such a manner that at least an organic dye and a polymeric surfactant are mixed and dispersed in an organic solvent, and the dispersion is coated onto a substrate. The ratio of the organic dye to the polymeric surfactant may be 1:99 to 99:1, preferably 40:60 to 95:5. The film thickness of the organic thin film recording layer may be suitably 10 Å to 10 μm, preferably 400 Å to 5000 Å.

The polymeric surfactant of the present invention may have an (weight) average molecular weight of 50,000 to 1,800,000, particularly 400,000 to 1,500,000.

To describe specifically the polymeric surfactant to be used in the present invention, the alkyl group having 1 to 4 carbon atoms of $R_2$, $R_3$, $R_4$ in the formula [I] may include methyl, ethyl, n- or iso-propyl, butyl groups and the like. Examples of the hydroxyalkyl group having 2 to 4 carbon atoms may include $-CH_2CH_2OH$, $-CH_2CH_2CH_2OH$, $-CH_2CH(CH_2OH)CH_3$ and the like. Of $R_2$, $R_3$ and $R_4$, preferred are methyl and ethyl groups.

As the alkylene group having 1 to 4 carbon atoms of B, $-CH_2CH_2-$, $-CH_2CH_2CH_2-$, $-CH_2CH(CH_3)-$ may be included, and as the hydroxyalkylene group having 2 to 4 carbon atoms, $-CH_2CH(OH)CH_2-$, etc. may be included. As B, preferred is $-CH_2CH_2-$.

As the anionic counterion of $X^\ominus$, halogen ions ($Cl^-$, $Br^-$, etc.), $CH_3OSO_3^-$, $C_2H_5OSO_3^-$, $HSO_4^-$, $H_2PO_4^-$, $CH_3CO_2^-$, $CH_3C_6H_4SO_3^-$, $CH_3SO_3^-$, $NO_3^-$, etc. may be included. Of $X^\ominus$, preferred are halogen ions, $CH_3OSO_3^-$ and $C_2H_5OSO_3^-$.

The monomer represented by the above formula can be easily obtained by the reaction of a nitrogen atom containing (meth)acrylate or (meth)acrylamide with a quaternarizing agent (methyl chloride, dimethylsulfuric acid, diethylsulfuric acid, benzyl chloride, etc.) or an acid (hydrochloric acid, sulfuric acid, nitric acid, phosphoric acid, acetic acid, p-toluenesulfonic acid, etc.).

It is also possible to use another copolymerizable monomer together with the monomer of the formula [I]. Such monomer may be mixed with the monomer of the formula [I] to provide a monomer to be copolymerized.

The polymer of the monomer [I] represented by the formula [I] in the present invention can be produced by polymerization of the monomer [I] or the monomer [I] and another monomer by use of a radical polymerization initiator.

Examples of the radical polymerization initiator may include initiators conventionally used such as inorganic or organic peroxides (e.g. hydrogen peroxide, di-t-butyl peroxide, cumene hydroperoxide, benzoyl peroxide, etc.), peracids (peracetic acid, perbenzoic acid, etc.), persulfates (ammonium persulfate, potassium persulfate, sodium persulfate, etc.) and aliphatic azo compounds (azobisisobutyronitrile, etc.).

The amount of the radical polymerization initiator employed may be generally 0.1 to 0.5% based on the weight of the monomer.

Polymerization reaction can be carried out at a polymerization temperature generally of 30° to 80° C., preferably 40° to 60° C., for polymerization time generally of 3 to 20 hours.

Also, the monomer of the above formula [I] may be mixed with or dissolved in another resin.

In this case, the resin to be used may include cellulose esters such as nitrocellulose, cellulose phosphate, cellulose sulfate, cellulose acetate, cellulose propionate, cellulose butyrate, cellulose myristate, cellulose palmitate, cellulose acetate propionate, cellulose acetate butyrate, etc.; cellulose ethers such as methyl cellulose, ethyl cellulose, propyl cellulose, butyl cellulose, etc.; vinyl resins such as polystyrene, polyvinyl chloride, polyvinyl acetate, polyvinyl butyral, polyvinyl acetal, polyvinyl alcohol, polyvinyl pyrrolidone, etc.; copolymer resins such as styrene-butadiene copolymer, styrene-acrylonitrile copolymer, styrene-butadiene-acrylonitrile copolymer, vinyl chloride-vinyl acetate copolymer, etc.; acrylic resins such as polymethyl methacrylate, polymethyl acrylate, polybutyl acrylate, polyacrylic acid, polymethacrylic acid, polyacrylamide, polyacrylonitrile, etc.; polyesters such as polyethylene terephthalate, etc.; polycarbonate resins such as poly(4,4'-isopropylidene diphenylene-co-1,4cyclohexylene dimethylene carbonate), poly(ethylenedioxy-3,3'-phenylene thiocarbonate), poly(4,4'-isopropylidene diphenylene carbonate-co-terephthalate), poly(4,4'-isopropylidene diphenylene carbonate), poly(4,4'-sec-butylidene diphenylene carbonate), poly (4,4'-isopropylidene diphenylene carbonate-block-oxyethylene), etc.; or polyamides, polyimides, epoxy resins, phenol resins, polyolefins such as polyethylene, polypropylene, chlorinated polyethylene, etc.

Examples of the organic dye to be used in the organic thin film recording layer of the present invention may include azo, stilbene, and phthalocyanine type direct dyes including cyanine, merocyanine, triphenylmethane, naphthoquinone, xanthene, squarium, croconium, azulene, methine and pyrilium, etc.; azo, anthraquinone, triphenylmethane, xanthene, and azine type acidic dyes; cyanine, azo, azine, triphenylmethane, azulene, methine, and pyrilium type basic dyes; azo, anthraquinone, xanthene, and triphenylmethane type mordants; acidic mordant dyes; anthraquinone and indigoid type vat dyes; azo, anthraquinone, naphthalocyanine, phthalocyanine, and triphenylmethane type oil-soluble dyes; sulfide dyes and metal complexes of dithiol type, etc.

Paricularly, basic dyes may be preferably used.

As the method for coating the organic thin film recording layer of the present invention, there may be mentioned, for example, dip coating, spray coating, spinner coating, bead coating, Meyer bar coating, blade coating, roller coating, curtain coating, and gravure coating methods. A dye thin film can be formed by such coating methods. The organic solvent for coating may include, for example, alcohols such as methanol, ethanol, isopropanol, diacetone alcohol, etc.; ketones such as acetone, methyl ethyl ketone, methyl isobutyl ketone, cyclohexanone, etc.; amides such as N,N-dimethylformamide, N,N-dimethylacetamide, etc.; sulfoxides such as dimethyl sulfoxide, etc.; ethers such as tetrahydrofuran, dioxane, ethylene glycol monomethyl ether, etc.; esters such as methyl acetate, ethyl acetate, butyl acetate, etc.; aliphatic halogenated hydrocarbons such as chloroform, methylene chloride, dichloroethylene, carbon tetrachloride, trichloroethylene, etc.; aromatics such as benzene, toluene, xylene, monochlorobenzene, dichlorobenzene, etc. However, when coating is carried out on a resin substrate, it is necessary to select an organic solvent which will not corrode the substrate.

When the organic solvent for coating is a poor solvent for the organic dye to be used in the organic thin film recording layer, the present invention is particularly effective.

Also, in the recording medium of the present invention, a subbing layer and a protective layer can be provided, if desired. The subbing layer may be used for the purpose of (a) improving adhesiveness, (b) as the barrier against water or gas, (c) for the purpose of improving storage stability of the recording layer and (d) forming a pre-groove. For the purpose (a), polymeric materials including various polymeric substances such as ionomer resin, polyamide resin, vinyl type resin, natural polymers, silicone, a liquid rubber, etc. and silane coupling agent, etc. can be used; for the purpose (b), in addition to the above polymeric materials, inorganic compounds such as $SiO_2$, $MgF_2$, SiO, $TiO_2$, $ZnO_2$, TiN, SiN, etc., metals or semi-metals such as Zn, Cu, S, Ni, Cr, Ge, Se, Au, Ag, Al, etc. can be used; for the purpose (c), the materials as exemplified for the above (a) and (b), and for the above purpose (d), UV-ray curable resins, thermosetting resins, thermoplastic resins, etc. can be used. The film thickness of the subbing layer may be suitably 0.1 to 50 μm, preferably 5 to 30 μm. On the other hand, the protective layer is provided for the purpose of protection against flaw, dust and contamination and improvement of chemical stability of the recording layer, and the same material as for the subbing layer can be used for its material. The film thickness of the protective layer may be 0.05 μm or more, preferably 5 μm or more.

The substrate in the present invention must be transparent to the laser beam used when a writing recording is performed from the substrate side, while it is not required to be transparent when recording is performed from the recording layer side. As the substrate, glasses, plastics such as polycarbonate, polymethyl methacrylate, etc. in the form of cylinders, films, cards, etc. may be generally used, but any other material which can be used for recording medium can be also used.

When a substrate readily corroded by the solvent such as a resin substrate, etc. is used, the present invention is particularly effective. The pit as mentioned in the present invention refers to a small concavity or a portion having density difference from the surrounding portion which is optically detectable formed by irradiation of photoenergy.

As described above, by the optical recording medium according to the present invention, the following effects can be obtained.

(1) An optical recording medium which is excellent in recording and reproducing characteristics and has an organic dye thin film with high reflectance, excellent uniformity and stability equal to those of a thin film comprising an organic dye alone can be obtained.

(2) An optical recording medium having an organic dye thin film with high reflectance and excellent uniformity and stability can be obtained even by use of a poor solvent for the organic dye.

The present invention is described in more detail by referring to Examples, by which the present invention is not limited at all.

EXAMPLE 1

A mixture of 2 parts by weight of the dye compound (1) shown below and 2 parts by weight of a polymeric surfactant obtained by polymerization of the monomer shown by the following formula (2) (average molecular weight: 1,100,000) with 96 parts by weight of an organic solvent, isopropyl alcohol/methanol (weight ratio: 1/1) was dispersed by means of a sand mill dispersing machine for 3 hours to provide a coating solution for organic thin film recording layer of Example 1.

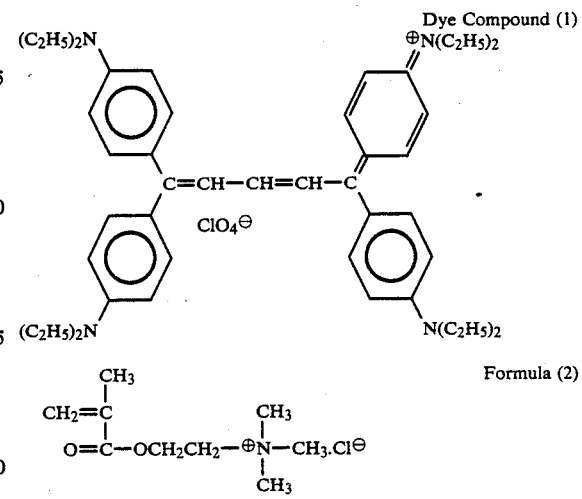

COMPARATIVE EXAMPLE 1

2 parts by weight of the dye compound (1) used in Example 1 were mixed and dissolved in 98 parts by weight of dichloroethane to prepare a coating solution of Comparative Example 1.

The coating solutions of Example 1 and Comparative Example 1 thus prepared were applied by spinner coating on smooth slide glass substrates to a dried film thickness of 900 Å to provide organic thin film recording layers respectively thereon.

The organic dye thin films of the above Example 1 and Comparative Example 1 were subjected to measurement of transmittance (T) % and reflectance (R) by means of a spectrophotometer, from which further absorption A (100-T-R) % was calculated (measurement was conducted by use of light of 830 nm, and the light was irradiated from the substrate side. For measurement of reflectance, a spectrophotometer provided with a 15° positively reflecting auxiliary equipment was used). The results are shown in Table-1.

TABLE 1

|  | Transmittance (T) % | Reflectance (R) % | Absorbance (A) % |
|---|---|---|---|
| Example 1 | 30 | 23 | 47 |
| Comparative Example 1 | 20 | 23 | 57 |

As can be seen from Table 1, Example 1 was slightly smaller in absorbance as compared with Comparative Example 1 in which a thin film comprising an organic dye alone was formed, but the same in reflectance as Comparative Example 1. This may be considered to be due to the fact that absorbance becomes smaller because the proportion of the organic dye compound (1) contained per unit volume in the organic dye thin film of Example 1 is ½ of that in Comparative Example 1, while high reflectance can be obtained because the dye molecules are mutually associated with each other in the polymeric surfactant to form an agglomerated body of dyes, namely the state of uniform micelle formation.

COMPARATIVE EXAMPLE 2

A mixture of 2 parts by weight of the dye compound (1) used in Example 1 and 98 parts by weight of an organic solvent, isopropyl alcohol/methanol (weight ratio: 1/1) was dispersed by means of a sand mill dispersing machine for 10 hours to prepare a coating solution of Comparative Example 2.

The coating solution of Comparative Example 2 was a dispersion in which crystalline particles remained which gave much irregularities even when coated by spinner coating similarly as described above, and no organic thin film having uniform micelle formed as in Example 1 could be obtained.

EXAMPLE 2, COMPARATIVE EXAMPLE 3

The coating solutions prepared in Example 1 and Comparative Example 1 were applied by spinner coating onto an acrylic substrate with a thickness of 1.2 mm and a diameter of 130 mm provided with a pregroove according to the photopolymer method to provide an organic thin film recording layer with a dried film thickness of 950 Å to prepare optical recording media of Example 2 and Comparative Example 3.

The optical recording medium thus prepared was mounted on a turn table, and under rotation of 1800 rpm, by use of a semiconductor laser with an oscillating wavelength of 830 nm, recording was performed with a spot size of 1.5 μm diameter, a recording power of 6 mW and a recording frequency of 2 MHz, while controlling the laser beam so that it may be converged on the organic thin film recording layer from the substrate side. Next, by means of the same device, reproduction of the recording section was conducted with a reproduction power of 0.5 mW, and the C/N ratio (carrier/noise ratio) was measured by spectrum analysis (scanning filter-band width 30 KHz) of its reproduced wave form.

The results of Example 2 and Comparative Example 3 are shown in Table-2.

TABLE 2

|  | C/N ratio (dB) |
|---|---|
| Example 2 | 55 |
| Comparative Example 3 | 51 |

As shown in Table-2, higher value of C/N ratio can be obtained in Example 2 than in Comparative Example 3, in spite of its content of the dye compound (1) per unit volume of the recording layer, which was ½ of that in Comparative Example 3. This may be considered to be the increased contrast ratio because the polymeric surfactant has made the pit more readily deformable.

EXAMPLE 3, COMPARATIVE EXAMPLE 4

The coating solutions used in Example 2 and Comparative Example 3 were applied, similarly as in Example 2, on a polycarbonate substrate with a thickness of 1.2 mm and a diameter of 130 mm provided with a pre-groove by injection molding to provide an organic thin film recording layer with a dried film thickness of 950 Å thereon to prepare optical recording media of Example 3 and Comparative Example 4.

As the result, in Comparative Example 4, the substrate was corroded by dichloroethane and became turbid, but in Example 3 a uniform organic thin film was formed and the C/N ratio was measured according to the same method as in Example 2 to be 53 dB.

EXAMPLES 4–7

Coating solutions for organic thin film recording layers for Examples 4–7 were respectively prepared according to the same method as in Example 1 by changing the dye compound and the polymeric surfactant used in Example 1 to the compounds shown in the following Table-3.

TABLE 3

| Dye Compound | Polymeric surfactant (monomer of the following formula is polymerized) |
|---|---|
| Example 4 $(H_3C)_2N\text{-}C_6H_4\text{-}C(\text{-}C_6H_5)=CH\text{-}CH=CH\text{-}C(\text{-}C_6H_5)=C_6H_4\text{=}N(CH_3)_2 \cdot ClO_4^{\ominus}$ | $H_2C=C(CH_3)\text{-}C(=O)\text{-}OCH_2CH_2\text{-}{}^{\oplus}N(C_2H_5)_3 \cdot {}^{\ominus}O\text{-}S(=O)_2\text{-}OC_2H_5$ (average molecular weight: 830,000) |

TABLE 3-continued

| Dye Compound | Polymeric surfactant (monomer of the following formula is polymerized) |
|---|---|
| Example 5 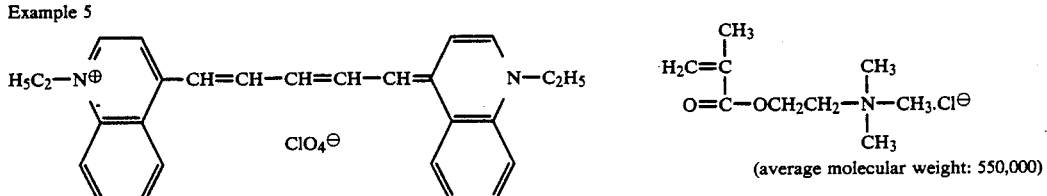 | 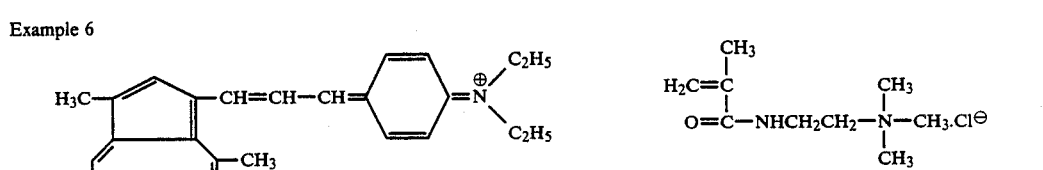 (average molecular weight: 550,000) |
| Example 6 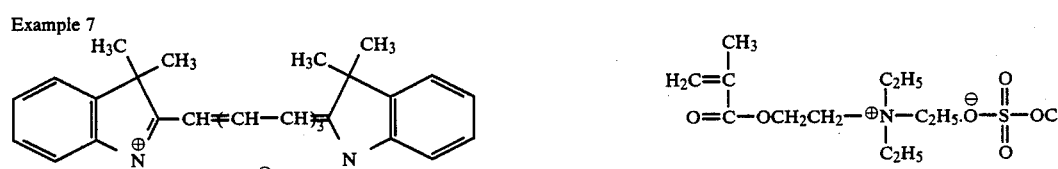 | 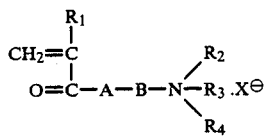 (average molecular weight: 940,000) |
| Example 7 | (average molecular weight: 1,400,000) |

The coating solutions of the above Examples 4–7 were applied onto a slide glass and an acrylic substrate provided with a pre-groove by the photopolymer method, according to the same methods as in Example 1 and Example 2, and transmittance, reflectance, absorbance and C/N ratio were measured. The results are shown in Table-4.

TABLE 4

| Example | Transmittance T (%) | Reflectance R (%) | Absorbance A (%) | C/N ratio (dB) |
|---|---|---|---|---|
| 4 | 20 | 25 | 55 | 56 |
| 5 | 24 | 23 | 53 | 50 |
| 6 | 25 | 22 | 53 | 52 |
| 7 | 15 | 27 | 58 | 53 |

As can be seen from Table-4, in the optical recording media of Examples 4–7, excellent values of reflectance and C/N ratio substantially equal to optical recording media of Comparative Example 1 and Comparative Example 4 having thin film recording layers comprising the organic dye alone were obtained.

What is claimed is:

1. An optical recording medium comprising an organic thin film recording layer on a substrate, which performs recording of information by forming a pit with photoenergy, said organic thin film recording layer comprising an organic dye and a polymeric surfactant, wherein said polymeric surfactant is a cationic polymeric surfactant comprising a polymer having a monomer represented by the following formula [I]:

$$\begin{array}{c} R_1 \\ | \\ CH_2{=}C \\ | \\ O{=}C{-}A{-}B{-}N{-}R_3 \cdot X^\ominus \\ | \\ R_4 \end{array} \begin{array}{c} R_2 \end{array}$$ Formula [I]

wherein $R_1$ is H or $CH_3$; $R_2$ and $R_3$ are alkyl groups having 1 to 4 carbon atoms or hydroxyalkyl groups having 2 to 4 carbon atoms, which may be either the same or different; $R_4$ is H, an alkyl group having 1 to 4 carbon atoms, an hydroxyalkyl group having 2 to 4 carbon atoms, or a benzyl group; A is an oxygen atom or NH; B is an alkylene group having 1 to 4 carbon atoms or an hydroxyalkylene group having 2 to 4 carbon atoms; and $X^\ominus$ is an anionic counterion.

2. An optical recording medium according to claim 1, wherein in the monomer shown by said formula [I], $R_2$, $R_3$ and $R_4$ are each methyl or ethyl group, and B is methylene group.

3. An optical recording medium according to claim 1, wherein said cationic polymeric surfactant has an (weight) average molecular weight of 50,000 to 1,800,000.

4. An optical recording medium according to claim 3, wherein said cationic polymeric surfactant has an (weight) average molecular weight of 400,000 to 1,500,000.

5. An optical recording medium according to claim 1, wherein the mixing ratio of said organic dye and said polymeric surfactant is 1:99 to 99:1.

6. An optical recording medium according to claim 5, wherein the mixing ratio of said organic dye and said polymeric surfactant is 40:60 to 95:5.

7. An optical recording medium according to claim 1, wherein said organic thin film recording layer has a film thickness of 10 Å to 10 μm.

8. An optical recording medium according to claim 7, wherein said organic thin film recording layer has a film thickness of 400 Å to 5000 Å.

9. An optical recording medium according to claim 1, wherein said organic dye is a basic dye.

10. A method for recording onto an optical recording medium, which comprises the step of irradiating with a laser beam an optical recording medium comprising an organic thin film recording layer containing an organic dye and a polymeric surfactant comprising a polymer having a monomer represented by the following formula [I] on a substrate, thereby forming a pit at the laser beam irradiated portion of said organic thin film recording layer, wherein formula [I] comprises:

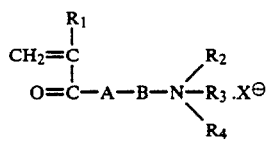

wherein $R_1$ is H or $CH_3$; $R_2$ and $R_3$ are alkyl groups having 1 to 4 carbon atoms or hydroxyalkyl groups having 2 to 4 carbon atoms, which may be either the same or different; $R_4$ is H, an alkyl group having 1 to 4 carbon atoms, an hydroxyalkyl group having 2 to 4 carbon atoms, or a benzyl group; A is an oxygen atom or NH; B is an alkylene group having 1 to 4 carbon atoms or an hydroxyalkylene group having 2 to 4 carbon atoms; and $X^\ominus$ is an anionic counterion.

11. An optical disc comprising an organic thin film recording layer for recording information by forming pit with photoenergy, said organic thin film recording layer comprising an organic dye and a polymeric surfactant, said polymeric surfactant comprising a polymer having a monomer represented by the following formula [I]:

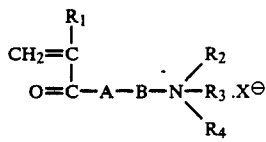

Formula [I]

wherein $R_1$ is H or $CH_3$; $R_2$ and $R_3$ are alkyl groups having 1 to 4 carbon atoms or hydroxyalkyl groups having 2 to 4 carbon atoms, which may be either the same or different; $R_4$ is H, an alkyl group having 1 to 4 carbon atoms, an hydroxyalkyl group having 2 to 4 carbon atoms, or a benzyl group; A is an oxygen atom or NH; B is an alkylene group having 1 to 4 carbon atoms or an hydroxyalkylene group having 2 to 4 carbon atoms; and $X^\ominus$ is an anionic counterion.

12. An optical card comprising an organic thin film recording layer for recording information by forming a pit with photoenergy, said organic thin film recording layer comprising an organic dye and a polymeric surfactant, said polymeric surfactant comprising a polymer having a monomer represented by the following formula [I]:

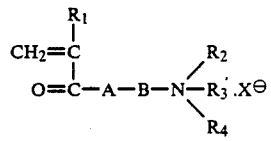

Formula [I]

wherein $R_1$ is H or $CH_3$; $R_2$ and $R_3$ are alkyl groups having 1 to 4 carbon atoms or hydroxyalkyl groups having 2 to 4 carbon atoms, which may be either the same or different; $R_4$ is H, an alkyl group having 1 to 4 carbon atoms, an hydroxyalkyl group having 2 to 4 carbon atoms, or a benzyl group; A is an oxygen atom or NH; B is an alkylene group having 1 to 4 carbon atoms or an hydroxyalkylene group having 2 to 4 carbon atoms; and $X^\ominus$ is an anionic counterion.

* * * * *

UNITED STATES PATENT AND TRADEMARK OFFICE
CERTIFICATE OF CORRECTION

PATENT NO. : 4,957,854

DATED : September 18, 1990

INVENTOR(S) : YOSHIHIRO OGUCHI ET AL.

It is certified that error appears in the above-identified patent and that said Letters Patent is hereby corrected as shown below:

COLUMN 2

Line 48, "muturally" should read --mutually--

COLUMN 7

Line 38, "formed" should read --formation--.

COLUMN 10

Line 35, " 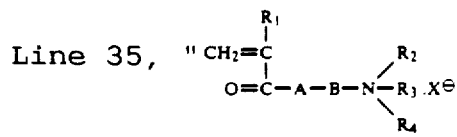 Formula [I] "

should read

-- 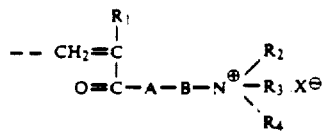 Formula [I] --.

Line 46, "an" should read --a--.
Line 49, "an" should read --a--.

UNITED STATES PATENT AND TRADEMARK OFFICE
CERTIFICATE OF CORRECTION

PATENT NO. : 4,957,854
DATED : September 18, 1990
INVENTOR(S) : YOSHIHIRO OGUCHI ET AL.

It is certified that error appears in the above-identified patent and that said Letters Patent is hereby corrected as shown below:

COLUMN 11

Line 19, " 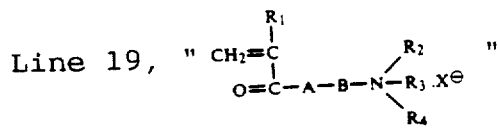 "

should read

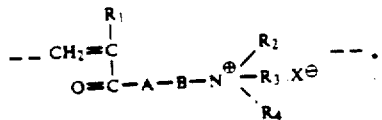 --.

Line 30, "an" should read --a--.
Line 33, "an" should read --a--.
Line 37, "pit" should read --a pit--.

COLUMN 12

Line 2, " 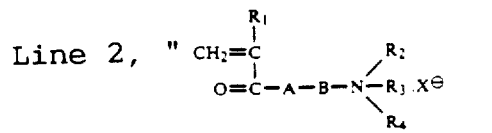        Formula [I] "

should read

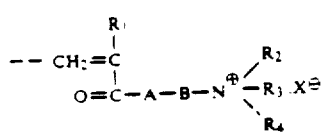        Formula [I] --.

UNITED STATES PATENT AND TRADEMARK OFFICE
CERTIFICATE OF CORRECTION

PATENT NO. : 4,957,854
DATED : September 18, 1990
INVENTOR(S) : YOSHIHIRO OGUCHI ET AL.

It is certified that error appears in the above-identified patent and that said Letters Patent is hereby corrected as shown below:

COLUMN 12

Line 12, "an" should read --a--.
Line 15, "an" should read --a--.

Line 26, "
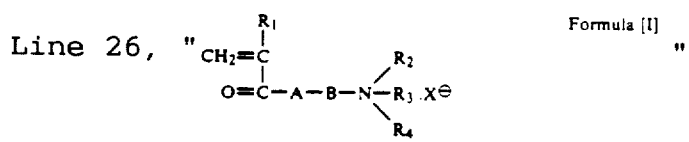
Formula [I]
"

should read

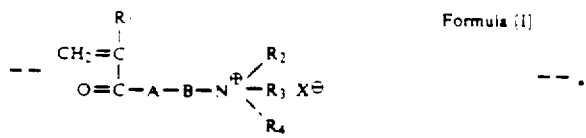
Formula [I]
--.

Line 36, "an" should read --a--.
Line 39, "an" should read --a--.

Signed and Sealed this

Eighth Day of December, 1992

Attest:

DOUGLAS B. COMER

Attesting Officer   Acting Commissioner of Patents and Trademarks